US010333686B2

United States Patent
Tabet et al.

(10) Patent No.: US 10,333,686 B2
(45) Date of Patent: Jun. 25, 2019

(54) ADAPTIVE HALF DUPLEX/FULL DUPLEX OPERATION FOR BATTERY AND ANTENNA CONSTRAINED DEVICES

(71) Applicant: Apple Inc., Cupertino, CA (US)

(72) Inventors: Tarik Tabet, Los Gatos, CA (US); Syed Aon Mujtaba, Santa Clara, CA (US); Samy Khay-Ibbat, San Francisco, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 15/077,998

(22) Filed: Mar. 23, 2016

(65) Prior Publication Data

US 2016/0337107 A1    Nov. 17, 2016

Related U.S. Application Data

(60) Provisional application No. 62/161,382, filed on May 14, 2015.

(51) Int. Cl.
*H04L 5/14* (2006.01)
*H04L 1/18* (2006.01)
*H04L 5/16* (2006.01)

(52) U.S. Cl.
CPC .............. *H04L 5/14* (2013.01); *H04L 1/1812* (2013.01); *H04L 5/16* (2013.01)

(58) Field of Classification Search
CPC ............ H04L 5/14; H04L 5/16; H04L 1/1812
See application file for complete search history.

(56) References Cited

U.S. PATENT DOCUMENTS 5,825,755 A   10/1998  Thompson et al.
8,149,743 B1   4/2012  Choksi
(Continued)

FOREIGN PATENT DOCUMENTS

CN        103327626 A      9/2013

OTHER PUBLICATIONS

Riihonen et al., "Hybrid Full-Duplex/Half-Duplex Relaying with Transmit Power Adaptation", IEE Transactions on Wireless Communications, vol. 10, No. 9, Sep. 15, 2011, 12 pages.
(Continued)

*Primary Examiner* — Zhensheng Zhang
(74) *Attorney, Agent, or Firm* — Meyertons Hood Kivlin Kowert and Goetzel PC; Jeffrey C. Hood; Brian E. Moore

(57) ABSTRACT

A user equipment (UE) and network entity implement improved communication methods which enable a UE to operate using differing modes of operation without detaching from a network. The UE may send first information indicating its capabilities to the network entity and may receive a first indication based on the first information. The first indication may indicate that the UE operate according to a first mode of operation. The UE may receive a second indication based on an occurrence of a first condition detectable at the network entity. The second indication may indicate that the UE operate according to a second mode of operation different from the first mode of operation. The first condition may be an initialization of a real time data packet session for the UE or may be a first message sent by the UE in response to one or more radio conditions exceeding a threshold.

20 Claims, 5 Drawing Sheets

(56) References Cited

U.S. PATENT DOCUMENTS

| | | | |
|---|---|---|---|
| 8,462,671 B2 | 6/2013 | Rinne et al. | |
| 8,542,617 B2 | 9/2013 | Choi et al. | |
| 2006/0025165 A1* | 2/2006 | Tillet | H04W 76/04 455/517 |
| 2007/0149245 A1* | 6/2007 | Berman | H04M 1/6041 455/556.1 |
| 2008/0130531 A1* | 6/2008 | Chou | H04W 76/12 370/310 |
| 2009/0296609 A1* | 12/2009 | Choi | H04W 72/121 370/281 |
| 2010/0034094 A1* | 2/2010 | Tenny | H04W 8/22 370/241 |
| 2011/0222445 A1* | 9/2011 | Alanara | H04J 1/100 370/281 |
| 2012/0252451 A1* | 10/2012 | Knauft | H04W 8/06 455/436 |
| 2013/0073746 A1* | 3/2013 | Singh | H04W 56/00 709/248 |
| 2013/0322302 A1* | 12/2013 | Gholmieh | H04W 36/24 370/280 |
| 2014/0064156 A1* | 3/2014 | Paladugu | H04W 36/0022 370/259 |
| 2016/0286449 A1* | 9/2016 | Choi | H04W 36/28 |

OTHER PUBLICATIONS

Office Action, Chinese Application for Invention No. 201610317740.7, dated Oct. 9, 2018, 22 pages.

* cited by examiner

ADAPTIVE HALF DUPLEX/FULL DUPLEX OPERATION FOR BATTERY AND ANTENNA CONSTRAINED DEVICES

PRIORITY DATA

This application claims benefit of priority to U.S. Provisional Application Ser. No. 62/161,382, titled "Adaptive Half Duplex/Full Duplex Operation for Battery and Antenna Constrained Devices", filed May 14, 2015 by Tarik Tabet, Syed Aon Mujtaba, Samy Khay-Ibbat, and Rafael L. Rivera-Barreto, which is hereby incorporated by reference in its entirety as though fully and completely set forth herein.

FIELD

The present application relates to wireless communication, and more particularly, adaptive hybrid automatic repeat request (HARQ) for half duplex operations for battery and antenna constrained devices in a radio access technology such as LTE.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, etc.

In cellular radio access technologies (RATs) such as LTE, the user equipment (UE) requests uplink (UL) resources by means of a scheduling request (SR). In response to a SR, the base station assigns UL resources to the UE with a UL grant. The base station can assign resources to the UE on every sub-frame. After the UE receives a UL grant, the UE can transmit data to the base station on the physical uplink shared channel (PUSCH).

A device which is peak current limited (i.e., a device that has limited battery and/or limited power amplifier capability) may not able to transmit continuously in the UL, e.g., it can transmit only on a low duty cycle. A device may be peak current limited because of the size of its battery (e.g., the device may only have a finite amount of current that may be drawn from the batter) and/or because of the efficiency of its antenna (e.g., in order to maintain connectivity with the base station, the antenna's power amplifier may need to operate at maximum output). Additionally, a device may have restrictions similar to a peak current limited device because of half duplex frequency division duplex (FDD) operation (e.g., when concurrent transmit and receive is not supported).

Additionally, if operating at continuous transmission, a peak current limited device may need to blank (e.g., not transmit) some UL sub-frames because the peak current limited device may not be able to sustain the expected continuous transmission. In response, a base station scheduler, not aware of the blanking of sub-frames, may react negatively by impacting throughput of the peak current limited device, which may lead to a decreased user experience.

Therefore, improvements in the field would be desirable.

SUMMARY

Embodiments are presented herein of, inter alia, a user equipment (UE), base station (eNB), and improved communication methods which enable a UE that is peak current limited to maintain an uplink timeline and notify a base station of differing duty cycles.

Embodiments relate to a user equipment device (UE) comprising at least one antenna, at least one radio, and one or more processors coupled to the radio. The at least one radio is configured to perform cellular communication using at least one radio access technology (RAT). The one or more processors and the at least one radio are configured to perform voice and/or data communications, as well as the methods described herein.

In some embodiments, the UE sends first information indicating the capabilities of the UE to a network entity (e.g., a base station or a mobile management entity) and receives a first indication based on the first information from the network entity. The first indication indicates that the UE operate according to a first mode of operation. The UE receives a second indication from the network entity based on an occurrence of a first condition detectable at the network entity. The second indication indicates that the UE operate according to a second mode of operation different from the first mode of operation. The first mode of operation can be one of a full duplex mode of operation and a half duplex mode of operation. The second mode of operation can be one of a full duplex mode of operation and a half duplex mode of operation.

In some embodiments, the first condition is an initialization of a real time data packet session for the UE, such as a voice over LTE (VoLTE) session. In such embodiments, the first mode of operation is full duplex operation and the second mode of operation is half duplex operation. Additionally, in some embodiments, the UE reverts to the first mode of operation for communications with the network based on an occurrence of a second condition detectable at the network entity. In some embodiments, the second condition is a completion of a real time data packet session, such as VoLTE session.

In some embodiments, the UE detects that one or more radio conditions exceed a threshold and sends a first message to the network entity in response. In such embodiments, the first condition is the first message. In response to receiving the first message, the network entity requests second information from the UE and the UE receives the request for second information from the network entity based on the occurrence of the first condition. The second information indicates updated capabilities of the UE. In such embodiments, the first mode of operation is half duplex operation and the second mode of operation is full duplex operation.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
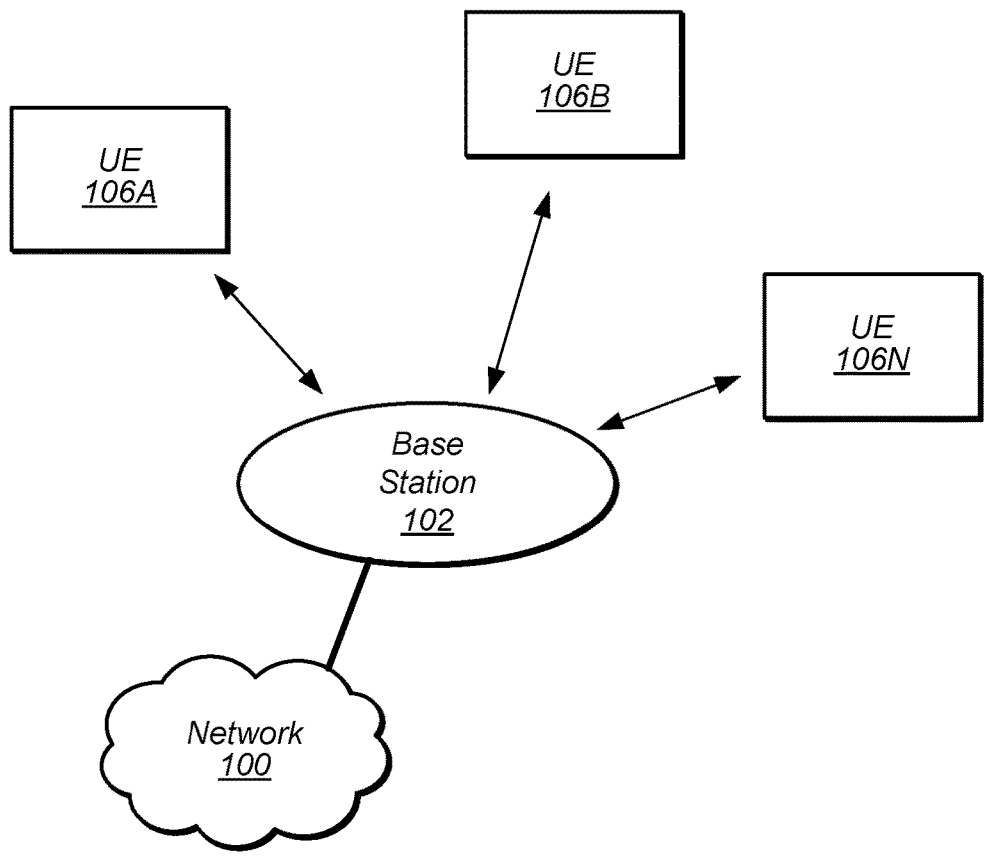
FIG. 1 illustrates a wireless communication system in accordance with some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
BS: Base Station
DL: Downlink (from BS to UE)
UL: Uplink (from UE to BS)
FDD: Frequency Division Duplexing
TDD: Time Division Duplexing
GSM: Global System for Mobile Communication
LTE: Long Term Evolution
TX: Transmission
RX: Reception
UMTS: Universal Mobile Telecommunication System
LAN: Local Area Network
WLAN: Wireless LAN
RAT: Radio Access Technology Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" may be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless telephone system or radio system.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 MHz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—Wireless Communication System

FIG. 1 illustrates an exemplary wireless cellular communication system. It is noted that FIG. 1 represents one possibility among many, and that features of the present disclosure may be implemented in any of various systems, as desired.

As shown, the exemplary wireless communication system includes a base station 102A which communicates over a transmission medium with one or more wireless devices 106A, 106B, etc., through 106N. Wireless devices may be user devices, which may be referred to herein as "user equipment" (UE) or UE devices.

The base station 102 may be a base transceiver station (BTS) or cell site, and may include hardware that enables wireless communication with the UE devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and/or between the UE devices 106 and the network 100.

The communication area (or coverage area) of the base station 102 may be referred to as a "cell." The base station 102 and the UEs 106 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and similar devices over a wide geographic area via one or more cellular communication technologies.

Thus, while base station 102 may presently represent a "serving cell" for wireless devices 106A-N as illustrated in FIG. 1, each UE device 106 may also be capable of receiving signals from one or more other cells (e.g., cells provided by other base stations), which may be referred to as "neighboring cells". Such cells may also be capable of facilitating communication between user devices and/or between user devices and the network 100.

Note that at least in some instances a UE device 106 may be capable of communicating using multiple wireless communication technologies. For example, a UE device 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication technologies (including more than two wireless communication technologies) are also possible. Likewise, in some instances a UE device 106 may be configured to communicate using only a single wireless communication technology.

Figure 2:
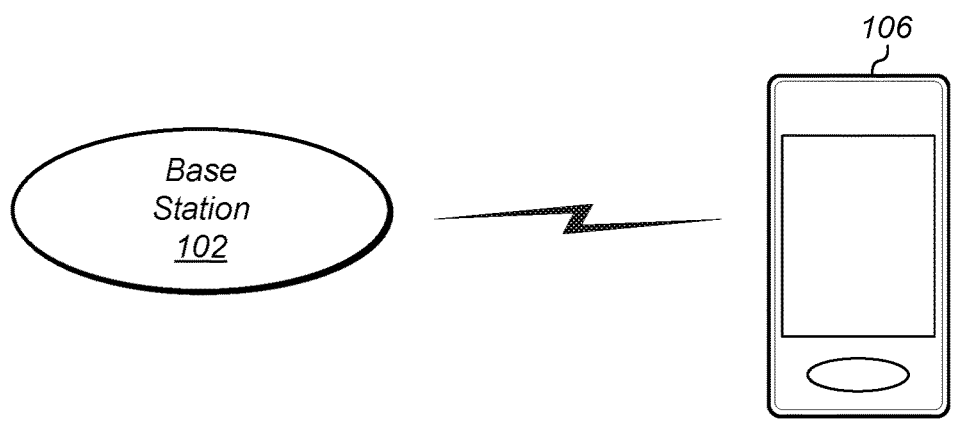
FIG. 2 illustrates a base station ("BS", or in the context of LTE, an "eNodeB" or "eNB") in communication with a wireless device, in accordance with some embodiments.

FIG. 2 illustrates UE device 106 (e.g., one of the devices 106A through 106N) in communication with base station 102. The UE device 106 may have cellular communication capability, and as described above, may be a device such as a mobile phone, a hand-held device, a media player, a computer, a laptop or a tablet, or virtually any type of wireless device.

The UE device 106 may include a processor that is configured to execute program instructions stored in memory. The UE device 106 may perform any of the method embodiments described herein by executing such stored instructions. Alternatively, or in addition, the UE device 106 may include a programmable hardware element such as an FPGA (field-programmable gate array), or other circuitry, that is configured to perform any of the method embodiments described herein, or any portion of any of the method embodiments described herein.

In some embodiments, the UE device 106 may be configured to communicate using any of multiple radio access technologies and/or wireless communication protocols. For example, the UE device 106 may be configured to communicate using one or more of GSM, UMTS, CDMA2000, LTE, LTE-A, WLAN, Wi-Fi, WiMAX or GNSS. Other combinations of wireless communication technologies are also possible.

The UE device 106 may include one or more antennas for communicating using one or more wireless communication protocols or technologies. In one embodiment, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE or 1×RTT (or LTE or GSM), and separate radios for communicating using each of Wi-Fi and Bluetooth. Other configurations are also possible.

Figure 3:
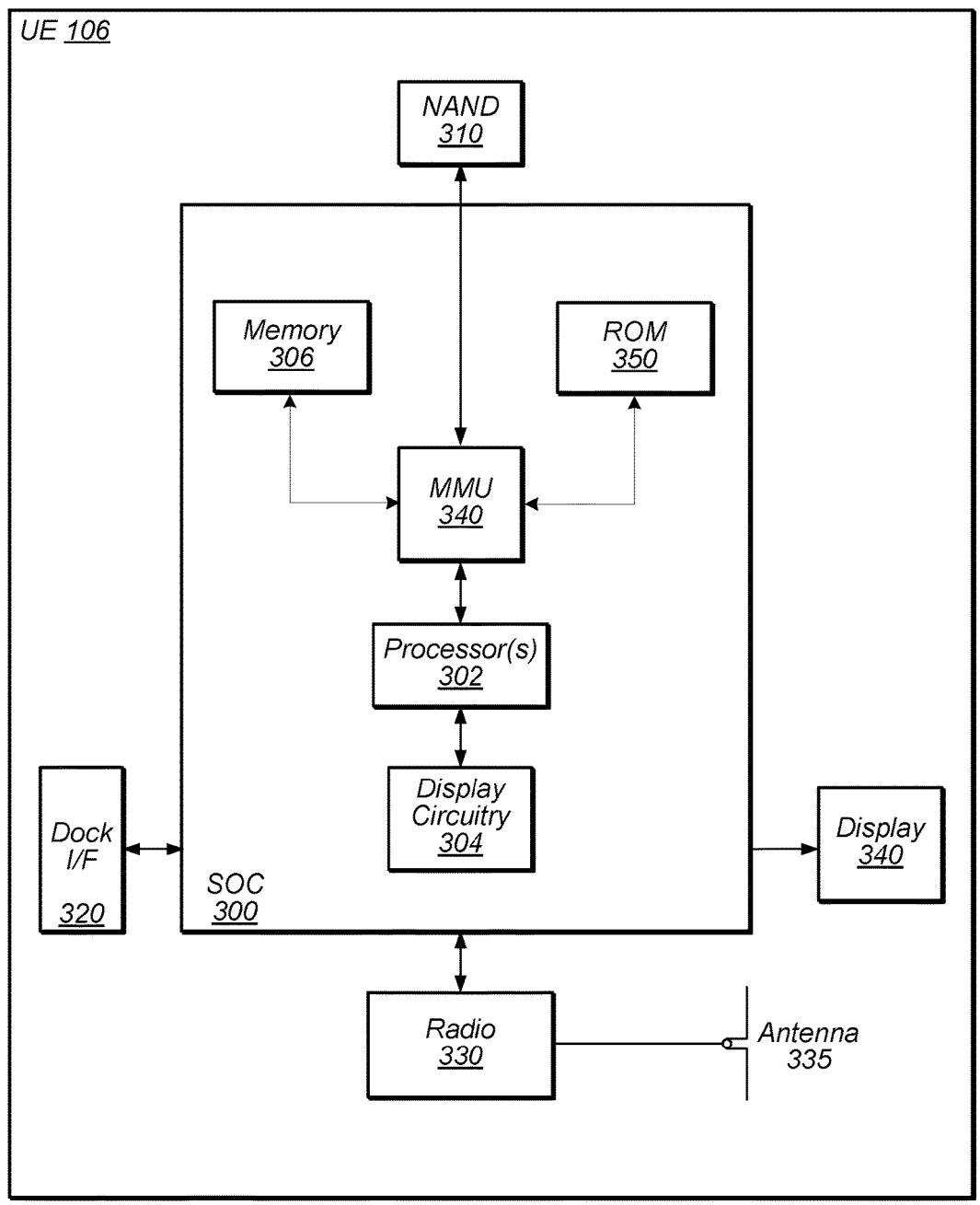
FIG. 3 illustrates a block diagram for a wireless device, in accordance with some embodiments.

FIG. 3—Example Block Diagram of a UE

FIG. 3 illustrates a block diagram of a UE 106 in accordance with some embodiments. As shown, the UE 106 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310). The MMU 340 may be configured to perform memory protection and page table translation or set up. In some embodiments, the MMU 340 may be included as a portion of the processor(s) 302.

The UE 106 may also include other circuits or devices, such as the display circuitry 304, radio 330, connector I/F 320, and/or display 340.

In the embodiment shown, ROM 350 may include a bootloader, which may be executed by the processor(s) 302 during boot up or initialization. As also shown, the SOC 300 may be coupled to various other circuits of the UE 106. For example, the UE 106 may include various types of memory (e.g., including NAND flash 310), a connector interface 320 (e.g., for coupling to a computer system), the display 340, and wireless communication circuitry (e.g., for communication using LTE, CDMA2000, Bluetooth, WiFi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE may in some embodiments be configured to communicate wirelessly using a plurality of wireless communication standards.

As described herein, the UE 106 may include hardware and software components for implementing the features described herein. For example, the processor(s) 302 of the UE 106 may be configured to implement part or all of the features described herein, e.g., by executing program instructions stored on a memory medium (e.g., a non-transitory computer-readable memory medium). Alternatively (or in addition), processor(s) 302 may be configured as a programmable hardware element, such as an FPGA (Field Programmable Gate Array), or as an ASIC (Application Specific Integrated Circuit). Alternatively (or in addition) the processor(s) 302 of the UE 106, in conjunction with one or more of the other components 300, 304, 306, 310, 320, 330, 335, 340, and 350 may be configured to implement part or all of the features described herein.

In addition, as described herein, processor(s) 302 may be comprised of one or more processing elements. In other words, one or more processing elements may be included in processor(s) 302. Thus, processor(s) 302 may include one or more integrated circuits (ICs) that are configured to perform the functions of processor(s) 302. In addition, each integrated circuit may include circuitry (e.g., first circuitry, second circuitry, etc.) configured to perform the functions of processor(s) 204.

Further, as described herein, radio 330 may be comprised of one or more processing elements. In other words, one or more processing elements may be included in radio 330. Thus, radio 330 may include one or more integrated circuits (ICs) that are configured to perform the functions of radio 330. In addition, each integrated circuit may include circuitry (e.g., first circuitry, second circuitry, etc.) configured to perform the functions of radio 330.

Figure 4:
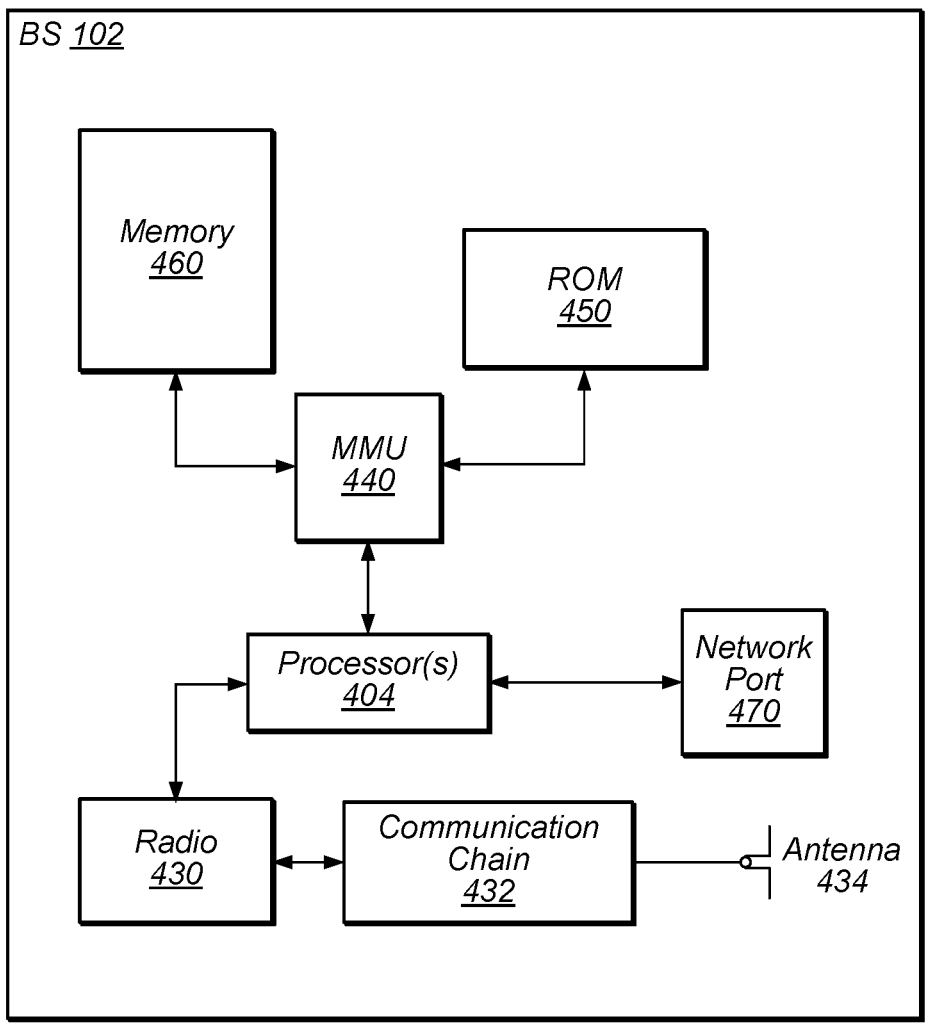
FIG. 4 illustrates a block diagram for a base station, in accordance with some embodiments.

FIG. 4—Base Station

FIG. 4 illustrates a base station 102 in accordance with some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430, a communication chain 432 and at least one antenna 434. The base station may be configured to operate as a wireless transceiver and may be further configured to communicate with UE devices 106 via radio 430, communication chain 432 and the at least one antenna 434. Communication chain 432 may be a receive chain, a transmit chain or both. The radio 430 may be configured to communicate via various RATs, including, but not limited to, GSM, UMTS, LTE, WCDMA, CDMA2000, WiMAX, etc.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Channels in LTE

LTE uses various channels so that data can be transported across the LTE radio interface. These channels are used to segregate the different types of data and allow them to be transported across the radio access network in an orderly fashion. The different channels effectively provide interfaces to the higher layers within the LTE protocol structure, and enable an orderly and defined segregation of the data.

There are three categories or types of LTE data channels as follows.

Physical channels: These are transmission channels that carry user data and control messages.

Transport channels: The physical layer transport channels offer information transfer to Medium Access Control (MAC) and higher layers.

Logical channels: Provide services for the Medium Access Control (MAC) layer within the LTE protocol structure.

LTE defines a number of physical downlink channels to carry information from the base station to the UE. The LTE downlink comprises a physical downlink shared channel (PDSCH), a physical downlink control channel (PDCCH), and a physical hybrid automatic repeat request (HARQ) indicator channel (PHICH). The PDSCH is the downlink channel that carries all user data and all signaling messages. The PDSCH is the main data bearing channel which is allocated to users on a dynamic and opportunistic basis. The PDCCH carries the layer one control for the shared channel. Thus, the PDSCH is the key channel for communicating information to the UE, and the PDCCH communicates metadata for the information, e.g., "who" the data is for, "what" data is sent, and "how" the data is sent over the air in the PDSCH. Further, the PHICH is the downlink channel that carries HARQ acknowledgments (ACK/NACK) for uplink data tranfers.

LTE also defines a number of physical uplink channels to carry information from the UE to the base station. The LTE uplink comprises a physical uplink shared channel (PUSCH) and a physical uplink control channel (PUCCH). The PUSCH is the uplink counterpart to the PDSCH. The PUCCH provides the various control signaling requirements for uplink communications including carrying the channel quality indicator (CQI), the rank indicator (RI), and the pre-coding matrix indicator (PMI), as well as, HARQ acknowledgments (ACK/NACK).

As described above, in LTE the base station (eNB) assigns UL resources using the PDCCH, wherein this assignment of resources is called a UL grant. The UL grant may be a type of persistent UL grant such as a semi-persistent scheduling (SPS) UL grant. The persistent or semi-persistent UL grant may be configured by radio resource control (RRC) layer signaling and the UE may be configured with SPS by the base station, and then the base station may activate the UE to use SPS. Persistent or semi-persistent UL grants, such as SPS, allows for a persistent, periodic UL grant. Thus, the UE may transmit new information periodically without receiving a new UL grant for each transmission. Alternatively, the UL grant may be for a specified amount of information, and the base station may send additional UL grants based on scheduling requests from the UE.

Power Constrained Devices

As described above, a device which is peak current limited (i.e., a device that has limited battery and/or limited power amplifier capability) may not able to transmit continuously in the UL, e.g., it can transmit only on a low duty cycle. A device may be peak current limited (or power constrained) because of the size of its battery (e.g., the device may only have a finite amount of current that may be drawn from the batter) and/or because it is link budget constrained (or limited). In other words, to maintain connectivity with a base station, a power amplifier of the device may need to operate at maximum power. However, because the device may have a small battery or may have a link budget constraint, the power amplifier may not be able to operate continuously at maximum power. In other words, when operating a maximum power, the power amplifier may only be able to operate at a lower duty cycle. Thus, the device may need to blank (e.g., not transmit) some scheduled UL sub-frames because the device may not be able to sustain continuous transmission as expected by the base station (or network). In response, a base station scheduler (other network scheduling entity such as a mobile management entity), not aware of the blanking of scheduled sub-frames, may react negatively by impacting throughput of the device, which may lead to a decreased user experience.

Current standards (e.g., 3GPP Release 8 (i.e., LTE)) support both full and half duplex frequency division duplex (FDD) operation. Full duplex FDD (FD-FDD) operation allows for concurrent transmit and receive in one sub-frame. Half duplex FDD (HD-FDD) does not allow for concurrent transmit and receive in one sub-frame. Further, current standards use adaptive HD-FDD, thus, a base station scheduler determines when an uplink (UL) or downlink (DL) sub-frame is scheduled. Additionally, HD-FDD allows a duty cycle of 4/8 (4 hybrid automatic repeat request (HARQ) process for UL and 4 HARQ processes for DL). Note that HARQ is a technique used by a receiver to detect a corrupted message and to request a new message from the sender. Further, HD-FDD may be enabled via radio resource control (RRC) signaling for UE capabilities between the network and the UE during attachment of the UE to a base station. In other words, the UE informs the base station and/or a mobility management entity (MME) of its capabilities once the UE attaches to the network and the UE can only report its capabilities again if it detaches and then attaches to the network.

Additionally, under current standards, whether the UE will be scheduled for HD-FDD or FD-FDD is determined during attachment when the UE indicates whether it supports HD-FDD. In some scenarios, the UE may not be able to fully comply with the scheduling requirements of FD-FDD and may blank sub-frames in order to conserve power. Thus, if the UE has a real time data packet session, such as a voice over LTE (VoLTE) session (or call), the UE may drop data packet transmissions which may lead to incomplete data transmissions during the session.

Described herein are systems, methods, and apparatuses that, depending on radio conditions and applications, allow a device (e.g., a device such as UE 106) to operate with differing modes of operation (duty cycles) within the context of current 3GPP standards.

FIGS. 5A-6B: Method for Switching Modes of Operation

Figure 5A:
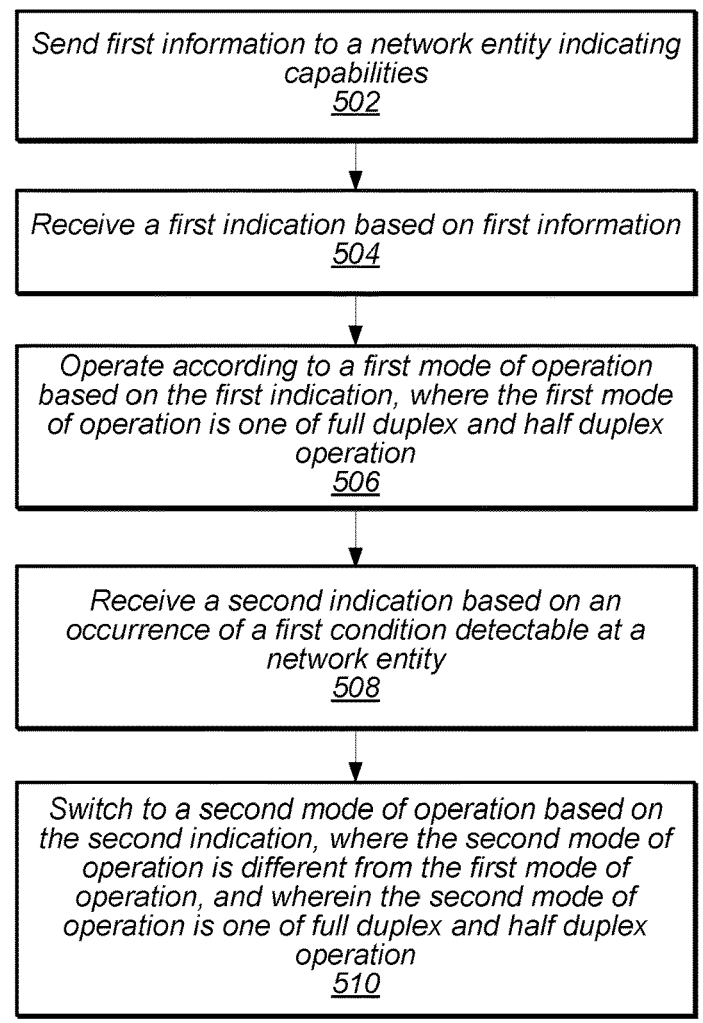
FIG. 5A illustrates a flow diagram of a method for a user equipment device to communicate with a network using differing modes of operation, in accordance with some embodiments.

FIG. 5A illustrates a method for a user equipment device to communicate with a network using differing modes of operation in accordance with some embodiments. The method shown in FIG. 5A may be used in conjunction with any of the systems or devices shown in the above Figures, among other devices. In various embodiments, some of the method elements shown may be performed concurrently, in a different order than shown, or may be omitted. In some embodiments the method may be performed by a UE, such as UE 106. The UE may be a power constrained (peak current limited) device. Note that additional method elements may also be performed as desired. As shown, this method may operate as follows.

At 502, a UE (e.g., such as UE 106) may send first information to a network entity. The network entity may be a mobility management entity (MME) comprised in or coupled to a base station (e.g., base station 102) or may be a base station (e.g., base station 102). The first information may indicate the capabilities of the UE. The capabilities may indicate that the UE supports full duplex frequency division duplexing (FD-FDD) (full duplex mode of operation), half duplex FDD (HD-FDD) (half duplex mode of operation), or both (although not concurrently). In some embodiments the capabilities may additionally indicate that the UE is a power constrained (or peak current limited) device.

At 504, the UE may receive a first indication based on the first information. The first indication may indicate that the UE operate according to a first mode of operation and, at 506, the UE may operate according to the first mode of operation based on the first indication. In some embodiments, the first mode of operation may be the full duplex mode of operation. In some embodiments, the first mode of operation may be the half duplex mode of operation. The network entity may be configured to detect a first condition. The first condition may be various conditions such as an initialization of a real time data packet session (e.g., a VoLTE session) or receipt of a message from the UE, among other conditions. Based on an occurrence of the first condition, the network entity may send a second indication to the UE. In some embodiments the indications sent by the network entity may be schedules, or other indicators associated with one of half-duplex or full-duplex modes of operation. The schedule information itself may be sent, or the indicators may be associated with predetermined or preconfigured schedule information.

At 508, the UE may receive the second indication that is based on the occurrence of the first condition. The second indication may indicate that the UE operate according to a second mode of operation.

At 510, the UE may switch to the second mode of operation based on the second indication where the second mode of operation is different from the first mode of operation. In some embodiments, the second mode of operation may be the half duplex mode of operation (e.g., when the first mode of operation may be the full duplex mode of operation). In some embodiments, the second mode of operation may be the full duplex mode of operation (e.g., when the first mode of operation may be the half duplex mode of operation).

As mentioned above, in some embodiments, the first condition may be an initialization of a real time data packet session (e.g., a VoLTE session) that may be detectable at (or by) the network entity. In such embodiments, the first mode of operation may be full duplex operation and the second mode of operation may be half duplex operation. Additionally, the UE may revert to the first mode of operation for communications with the network based on an occurrence of a second condition that may also be detectable by the network entity. In some embodiments, the second condition may be a completion of a real time data packet session.

As mentioned above, in some embodiments, the first condition may be receipt of a message from the UE. In such embodiments, the UE may detect that one or more radio conditions exceed a threshold and may send a message to the network entity in response. The message may be a tracking area update and may cause the UE capabilities to be deleted at the network entity. The message may be a non-E-UTRAN (evolved universal terrestrial radio access network) message such as a tracking area update message. Additionally, the UE may receive a request for second information from the network entity based on the occurrence of the first condition (e.g., receipt of the message). The second information may indicate updated capabilities of the UE. The request may be a radio resource control (RRC) level request.

Figure 5B:
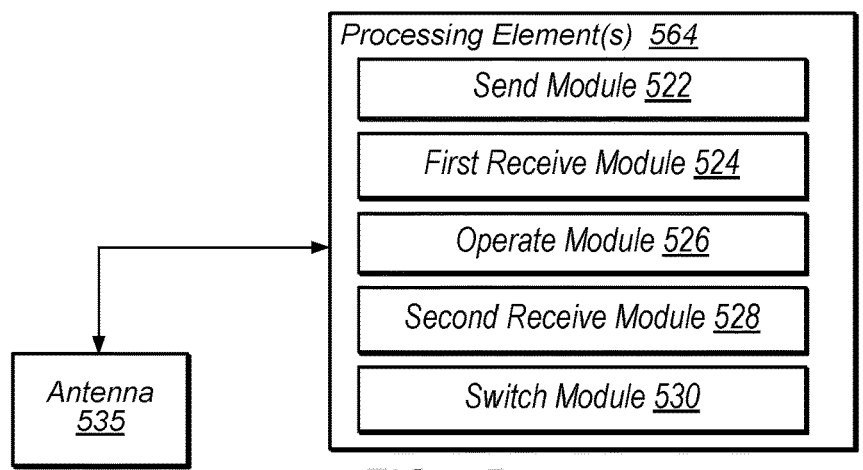
FIG. 5B illustrates a processing element including modules to communicate with a network using differing modes of operation in accordance with some embodiments.

FIG. 5B illustrates a processing element including modules to communicate with a network using differing modes of operation in accordance with some embodiments. In some embodiments, antenna 535 may be coupled to processing element 564. The processing element may be configured to perform the method described above in reference to FIG. 5A. In some embodiments, processing element 564 may include one or more modules, such as modules (or circuitry) 522, 524, 526, 528, and 530, and the modules (or circuitry) may be configured to perform various steps of the method described above in reference to FIG. 5B. In some embodiments, the processing element may be included in a UE, such as UE 106 described above. In some embodiments, the UE may be a power constrained (peak current limited) device. In some embodiments, the processing element may be included in a baseband processor of a UE (e.g., the processing element may be included in radio 330 of UE 106). As shown, the modules may be configured as follows.

In some embodiments, processing element 564 may include a send module 522 configured to send first information to a network entity. The network entity may be a mobility management entity (MME) comprised in or coupled to a base station (e.g., base station 102) or may be a base station (e.g., base station 102). The first information may indicate capabilities of a UE. The capabilities may indicate that the UE supports full duplex frequency division duplexing (FD-FDD) (full duplex mode of operation), half duplex FDD (HD-FDD) (half duplex mode of operation), or both (although not concurrently). In some embodiments the capabilities may additionally indicate that the UE is a power constrained (or peak current limited) device.

In some embodiments, processing element 564 may include a first receive module 524 configured to receive a first indication based on the first information. The first indication may indicate that the UE operate according to a first mode of operation.

In some embodiments, processing element 564 may include an operate module 526 configured to operate according to the first mode of operation based on the first indication. In some embodiments, the first mode of operation may be the full duplex mode of operation. In some embodiments, the first mode of operation may be the half duplex mode of operation. The network entity may be configured to detect a first condition. The first condition may be various conditions such as an initialization of a real time data packet session (e.g., a VoLTE session) or receipt of a message from the UE, among other conditions. Based on an occurrence of the first condition, the network entity may send a second indication to the UE. In some embodiments the indications sent by the network entity may be schedules, or other indicators associated with one of half-duplex or full-duplex modes of operation. The schedule information itself may be sent, or the indicators may be associated with predetermined or preconfigured schedule information.

In some embodiments, processing element 564 may include a second receive module 528 configured to receive the second indication that is based on the occurrence of the first condition. The second indication may indicate that the UE operate according to a second mode of operation.

In some embodiments, processing element 564 may include a switch module 530 configured to switch to the second mode of operation based on the second indication where the second mode of operation is different from the first mode of operation. In some embodiments, the second mode of operation may be the half duplex mode of operation (e.g., when the first mode of operation may be the full duplex mode of operation). In some embodiments, the second mode of operation may be the full duplex mode of operation (e.g., when the first mode of operation may be the half duplex mode of operation).

Note that in some embodiments, the first condition may be an initialization of a real time data packet session (e.g., a VoLTE session) that may be detectable at (or by) the network entity. In such embodiments, the first mode of operation may be full duplex operation and the second mode of operation may be half duplex operation. Additionally, the UE may revert to the first mode of operation for communications with the network based on an occurrence of a second condition that may also be detectable by the network entity. In some embodiments, the second condition may be a completion of a real time data packet session.

In addition, in some embodiments, the first condition may be receipt of a message from the UE. In such embodiments, the UE may detect that one or more radio conditions exceed a threshold and may send a message to the network entity in response. The message may be a tracking area update and may cause the UE capabilities to be deleted at the network entity. The message may be a non-E-UTRAN (evolved universal terrestrial radio access network) message such as a tracking area update message. Additionally, the UE may receive a request for second information from the network entity based on the occurrence of the first condition (e.g., receipt of the message). The second information may indicate updated capabilities of the UE. The request may be a radio resource control (RRC) level request.

It is apparent for those skilled in the art that, for the particular processes of the modules (or circuitry) described above (such as modules 522, 524, 526, 528, and 530), reference may be made to the corresponding steps (such as steps 502, 504, 506, 508, and 510, respectively) in the related process embodiment sharing the same concept and the reference is regarded as the disclosure of the related modules (or circuitry) as well. Furthermore, processing element 564 may be implemented in software, hardware or combination thereof. More specifically, processing element 564 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 564 may be implemented as a general-purpose processor such as a CPU, and therefore each module can be implemented with the CPU executing instructions stored in a memory which perform a respective step.

Figure 6A:
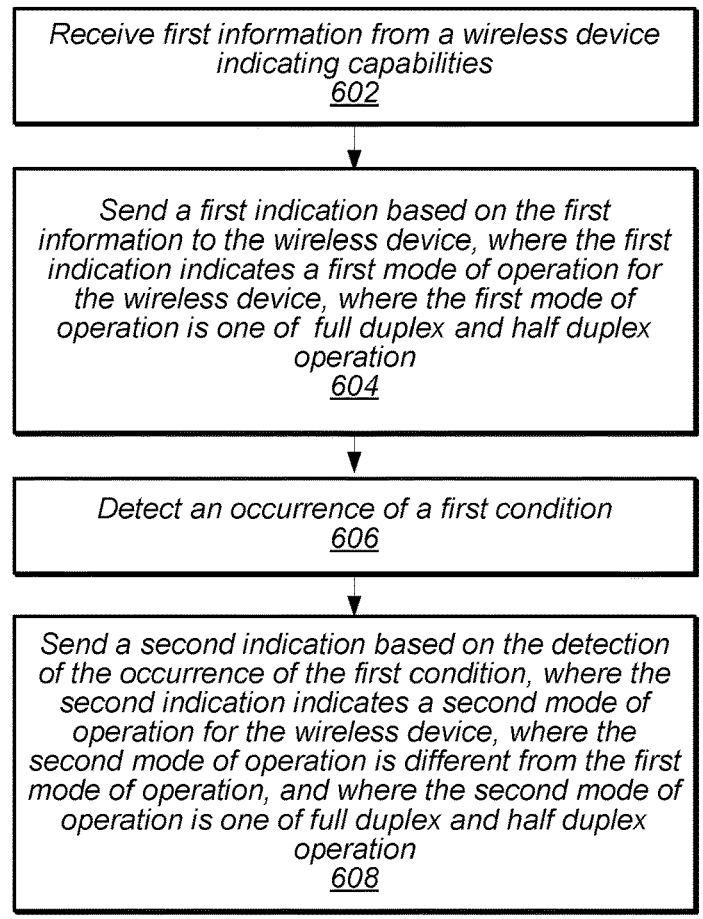
FIG. 6A illustrates a flow diagram of a method for a network entity to schedule a wireless device for differing modes of operation, in accordance with some embodiments.

FIG. 6A illustrates a method for a network entity to schedule a wireless device for differing modes of operation in accordance with some embodiments. The method shown in FIG. 6A may be used in conjunction with any of the systems or devices shown in the above Figures, among other devices. In various embodiments, some of the method elements shown may be performed concurrently, in a different order than shown, or may be omitted. In some embodiments the method may be performed by a base station, base station scheduler, or a mobile management entity, among other network entities. The wireless device may be a UE, such as UE 106. The wireless device may be a power constrained (peak current limited) device. Note that additional method elements may also be performed as desired. As shown, this method may operate as follows.

At 602, the network entity may receive first information from a wireless device. The first information may indicate capabilities of the wireless device, such as whether the wireless device supports FD-FDD and/or HD-FDD and whether the wireless device is a power constrained device, among other capabilities.

At 604, the network entity may send a first indication based on the first information to the wireless device. The first indication may indicate a first mode of operation for the wireless device. In some embodiments, the first mode of operation may be FD-FDD. In other embodiments, the first mode of operation may be HD-FDD.

At 606, the network entity may detect an occurrence of a first condition. The first condition may be an initialization of a real time data packet session (e.g., a VoLTE session) between the wireless device and the network or may be the receipt of a message from the wireless device that may trigger the network entity to request updated capabilities from the wireless device. In some embodiments, in response to receipt of the message from the wireless device, the network entity may delete all capabilities of the wireless device prior to requesting updated capabilities.

At 608, the network entity may send a second indication based on the detection of the occurrence of the first condition. The second indication may indicate a second mode of operation for the wireless device that is different from the first mode of operation. In embodiments in which the first condition is the initialization of a real time data packet session, the second indication may cause the wireless device to switch from FD-FDD operation to HD-FDD operation. In embodiments in which the first condition is receipt of a message from the wireless device, the second indication may cause the wireless device to switch from HD-FDD operation to FD-FDD operation. In some embodiments the indications sent by the network entity may be schedules, or other indicators associated with one of half-duplex or full-duplex modes of operation. The schedule information itself may be sent, or the indicators may be associated with predetermined or preconfigured schedule information.

In further embodiments, the network entity may detect an occurrence of a second condition, such as a completion or termination of a real time data packet session or receipt of another message from the wireless device, among other second conditions. In response to the occurrence of the second condition, the network entity may send a third indication to the wireless device indicating that the wireless device reverts back to operation according to the first mode of operation.

Figure 6B:
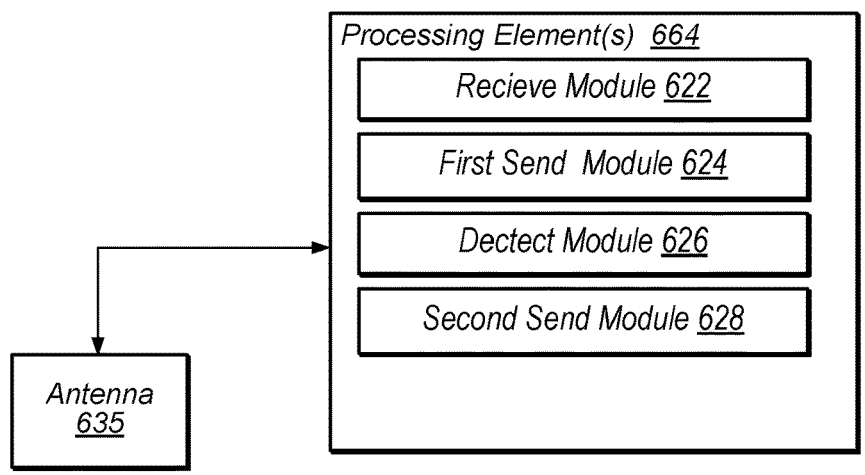
FIG. 6B illustrates a processing element including modules to schedule a wireless device for differing modes of operation in accordance with some embodiments.

FIG. 6B illustrates a processing element including modules to schedule a wireless device for differing modes of operation in accordance with some embodiments. In some embodiments, antenna 635 may be coupled to processing element 664. The processing element may be configured to perform the method described above in reference to FIG. 6A. In some embodiments, processing element 664 may include one or more modules, such as modules (or circuitry) 622, 624, 626, and 628, and the modules (or circuitry) may be configured to perform various steps of the method described above in reference to FIG. 6B. In some embodiments, the processing element may be included in a network entity, such as base station 102 described above. In some embodiments, the wireless device being scheduled may be a power constrained (peak current limited) device. In some embodiments, the processing element may be included in a baseband processor of a base station (e.g., the processing element may be included in radio 430 of base station 102). As shown, the modules may be configured as follows.

In some embodiments, processing element 664 may include a receive module 622 configured to receive first information from a wireless device. The first information may indicate capabilities of the wireless device, such as whether the wireless device supports FD-FDD and/or HD-FDD and whether the wireless device is a power constrained device, among other capabilities.

In some embodiments, processing element 664 may include a first send module 624 configured to send a first indication based on the first information to the wireless device. The first indication may indicate a first mode of operation for the wireless device. In some embodiments, the first mode of operation may be FD-FDD. In other embodiments, the first mode of operation may be HD-FDD.

In some embodiments, processing element 664 may include a detect module 626 configured to detect an occurrence of a first condition. The first condition may be an initialization of a real time data packet session (e.g., a VoLTE session) between the wireless device and the network or may be the receipt of a message from the wireless device that may trigger a request for updated capabilities from the wireless device. In some embodiments, in response to receipt of the message from the wireless device, all capabilities of the wireless device may be deleted prior to requesting updated capabilities.

In some embodiments, processing element 664 may include a second send module 628 configured to send a second indication based on the detection of the occurrence of the first condition. The second indication may indicate a second mode of operation for the wireless device that is different from the first mode of operation. In embodiments in which the first condition is the initialization of a real time data packet session, the second indication may cause the wireless device to switch from FD-FDD operation to HD-FDD operation. In embodiments in which the first condition is receipt of a message from the wireless device, the second indication may cause the wireless device to switch from HD-FDD operation to FD-FDD operation. In some embodiments the indications sent may be schedules, or other indicators associated with one of half-duplex or full-duplex modes of operation. The schedule information itself may be sent, or the indicators may be associated with predetermined or preconfigured schedule information.

In further embodiments, an occurrence of a second condition may be detected, such as a completion or termination of a real time data packet session or receipt of another message from the wireless device, among other second conditions. In response to the occurrence of the second condition, a third indication may be sent to the wireless device indicating that the wireless device reverts back to operation according to the first mode of operation.

It is apparent for those skilled in the art that, for the particular processes of the modules (or circuitry) described above (such as modules 622, 624, 626, and 628), reference may be made to the corresponding steps (such as steps 602, 604, 606, and 608, respectively) in the related process embodiment sharing the same concept and the reference is regarded as the disclosure of the related modules (or circuitry) as well. Furthermore, processing element 664 may be implemented in software, hardware or combination thereof. More specifically, processing element 664 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 664 may be implemented as a general-purpose processor such as a CPU, and therefore each module can be implemented with the CPU executing instructions stored in a memory which perform a respective step.

Further Embodiments

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

In some embodiments a network entity may comprise a radio and a processing element operatively coupled to the radio. The network entity may be configured to receive first information from a wireless device, send a first indication based on the first information to the wireless device, detect an occurrence of a first condition, and send a second indication based on the detection of the occurrence of the first condition. The first information may indicate capabilities of the wireless device. The first indication may indicate a first mode of operation for the wireless device and the first mode of operation may be one of full duplex and half duplex operation. The second indication may indicate a second mode of operation for the wireless device, the second mode of operation may be different from the first mode of operation, and the second mode of operation may be one of full duplex and half duplex operation. In some embodiments, the first mode of operation may be full duplex operation and the second mode of operation may be half duplex operation. In some embodiments, the first condition may be an initialization of a real time data packet session. In some embodiments, the first condition may be receiving a first message from the wireless device.

In some embodiments a network entity may comprise a radio and a processing element operatively coupled to the radio. The network entity may be configured to receive first information from a wireless device receive first information from the wireless device indicating capabilities of the wireless device, send a first indication to the wireless device for the wireless device to operate according to a full duplex mode of operation, detect a first condition, and send, based on the detection of the first condition, a second indication to the wireless device for the wireless device to operate according to a half duplex mode of operation. In some embodiments, the capabilities may comprise one or more of a first parameter that indicates that the wireless device supports half duplex operation and a second parameter that indicates that the wireless device is a power constrained device. In some embodiments, the first condition may be a real time data packet session and, in some embodiments, the real time data packet session may comprise a voice over LTE (VoLTE) session. In some embodiments, the network entity may be further configured to detect a second condition subsequent to detection of the first condition and send, based on the detection of the second condition, a third indication to the wireless device for the wireless device to operate according to full duplex operation. In some embodiments, the second condition may be a completion of a real time data packet session.

In some embodiments a network entity may comprise a radio and a processing element operatively coupled to the radio. The network entity may be configured to receive first information from a wireless device receive first information from the wireless device indicating capabilities of the wireless device, send a first indication to the wireless device for the wireless device to operate according to a half duplex mode of operation, receive first information from a wireless device indicating capabilities of the wireless device, receive second information from the wireless device indicating updated capabilities of the wireless device, and send, based on the received second information, a second indication to the wireless device for the wireless device to operate according to a full duplex mode of operation. In some embodiments, the network entity may be further configured to receive a first message from the wireless device and request the second information in response to the first message. The first message may be a tracking area update. In some embodiments, the network entity may be configured to delete wireless device capabilities in response to the first message. The request may be at radio resource control (RRC) level. In some embodiments, the first information may be received based on radio conditions meeting a threshold.

In some embodiments, a user equipment device (UE) may comprise at least one antenna, at least one radio configured to perform cellular communication using at least one radio access technology (RAT), and one or more processors coupled to the at least one radio and configured to perform voice and/or data communications. The UE may be configured to send first information to an entity of a network indicating capabilities of the UE, receive, from the entity, a first indication based on the first information from the entity, operate according to a half duplex mode of operation based on the first indication, send second information to the entity indicating updated capabilities of the UE, receive, from the entity, a second indication based the second information, and switch to a full duplex mode of operation based on the second indication. In some embodiments, the UE may be further configured to determine that one or more radio conditions meet a threshold and send the second information based on the one or more radio conditions meeting the threshold. In some embodiments, the UE may be further configured to send a first message to the entity and the entity may be configured to request the second information in response to the first message. The first message may be a tracking area update. In some embodiments, the entity may be further configured to delete UE capabilities in response to the first message.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   a memory; and
   one or more processors coupled to the memory, wherein the one or more processors are configured to:
   send first information to a network entity, wherein the first information indicates capabilities of a user equipment device (UE), wherein the capabilities indicate that the UE is power constrained and whether the UE supports a full duplex frequency division duplexing (FD-FDD) mode of operation, a half duplex FDD (HD-FDD) mode of operation, or both FD-FDD and HD-FDD modes of operation;
   receive, from the network entity, a first indication based on the first information, wherein the first indication indicates a first mode of operation of the UE, and wherein the network entity comprises one of a mobility management entity (MME) coupled to a base station or a base station;
   operate according to the first mode of operation based on the first indication, wherein the first mode of operation is the FD-FDD mode of operation;
   transmit, to the network entity, a tracking area update message in response to detecting, at the UE, that one or more radio conditions exceed a threshold;
   receive, from the network entity, a second indication based on an occurrence of a first condition detectable at the network entity, wherein the first condition comprises receipt of the tracking area update message from the UE; and
   switch to a second mode of operation based on the second indication, wherein the second mode of operation is different from the first mode of operation, and wherein the second mode of operation is the HD-FDD mode of operation.

2. The apparatus of claim 1, wherein the one or more processors are further configured to:
revert to the first mode of operation for communications with the network based on an occurrence of a second condition detectable at the network entity.

3. The apparatus of claim 2, wherein the second condition is a completion of a real time data packet session.

4. The apparatus of claim 3, wherein the real time data packet session comprises a voice over LTE (VoLTE) session.

5. The apparatus of claim 1, wherein the one or more processors are further configured to:
receive a request for information from the network entity based on the occurrence of the first condition, wherein the information indicates updated capabilities of the UE.

6. The apparatus of claim 1, wherein the first indication is a transmission schedule.

7. The apparatus of claim 1, wherein the first indication is associated with predetermined or preconfigured schedule information.

8. A non-transitory computer readable memory medium storing program instructions executable by a processor to cause a user equipment device (UE) to:
send first information to a network entity, wherein the first information indicates capabilities of the UE, wherein the capabilities indicate that the UE is power constrained and whether the UE supports a full duplex mode of operation, a half duplex mode of operation, or both full duplex and half duplex modes of operation, and wherein the network entity comprises a mobility management entity (MME) coupled to a base station;
receive, from the network entity, a first indication based on the first information, wherein the first indication indicates a full duplex mode of operation of the UE;
operate according to the first mode of operation based on the first indication;
transmit, to the network entity, a tracking area update message in response to detecting, at the UE, that one or more radio conditions exceed a threshold;
receive, from the network entity, a second indication based on an occurrence of a first condition detectable at the network entity, wherein the first condition comprises receipt of the tracking area update message from the UE; and
switch to a second mode of operation of the UE based on the second indication received from the network entity, wherein the second mode of operation is different from the first mode of operation, wherein the second indication is received in response to the tracking area update message, and wherein the second mode of operation is half duplex operation.

9. The non-transitory computer readable memory medium of claim 8,
wherein the program instructions are further executable to:
revert to the first mode of operation based on a third indication received from the network entity.

10. The non-transitory computer readable memory medium of claim 8,
wherein the tracking area update message is a non evolved universal terrestrial radio access network (E-UTRAN) message.

11. The non-transitory computer readable memory medium of claim 8,
wherein the first indication is a transmission schedule.

12. The non-transitory computer readable memory medium of claim 8,
wherein the first indication is associated with predetermined or preconfigured schedule information.

13. The non-transitory computer readable memory medium of claim 8,
wherein the program instructions are further executable to cause the UE to:
receive a request for information from the network entity based on the occurrence of the first condition, wherein the information indicates updated capabilities of the UE.

14. A user equipment device (UE), comprising:
at least one antenna;
at least one radio, wherein the at least one radio is configured to perform cellular communication using at least one radio access technology (RAT);
one or more processors coupled to the at least one radio, wherein the one or more processors and the at least one radio are configured to perform voice and/or data communications;
wherein the one or more processors are configured to cause the UE to:
send first information to a network entity, wherein the first information indicates capabilities of the UE, wherein the capabilities indicate that the UE is power constrained and whether the UE supports a full duplex mode of operation, a half duplex mode of operation, or both full duplex and half duplex modes of operation, and wherein the network entity comprises a mobility management entity (MME) coupled to a base station;
receive, from the network entity, a first indication based on the first information, wherein the first indication indicates a full duplex mode of operation of the UE;
operate according to the full duplex mode of operation based on the first indication;
transmit, to the network entity, a tracking area update message in response to detecting, at the UE, that one or more radio conditions exceed a threshold;
receive, from the network entity, a second indication based on an occurrence of a first condition detectable at the network entity, wherein the first condition comprises receipt of the tracking area update message from the UE; and
switch to a half duplex mode of operation in response to receiving the second indication.

15. The UE of claim 14,
wherein the one or more processors are further configured to cause the UE to:
revert to the full duplex mode of operation for communications with the network based on an occurrence of a second condition detectable at the network entity.

16. The UE of claim 15,
wherein the second condition is a completion of a real time data packet session.

17. The UE of claim 16,
wherein the real time data packet session comprises a voice over LTE (VoLTE) session.

18. The UE of claim 14,
wherein the one or more processors are further configured to cause the UE to:
    receive a request for information from the network entity based on the occurrence of the first condition, wherein the information indicates updated capabilities of the UE.

19. The UE of claim 14,
wherein the tracking area update message is a non evolved universal terrestrial radio access network (E-UTRAN) message.

20. The UE of claim 14,
wherein the first indication is associated with predetermined or preconfigured schedule information.

\* \* \* \* \*